US007031888B2

(12) United States Patent
Astorino

(10) Patent No.: US 7,031,888 B2
(45) Date of Patent: Apr. 18, 2006

(54) DEEP DESIGN FILTER METHOD FOR DESIGN

(76) Inventor: Louis Don Astorino, 17 Holland Rd., Pittsburgh, PA (US) 15235

( * ) Notice: Subject to any disclaimer, the term of this patent is extended or adjusted under 35 U.S.C. 154(b) by 0 days.

(21) Appl. No.: 10/820,566

(22) Filed: Apr. 7, 2004

(65) Prior Publication Data

US 2004/0210331 A1 Oct. 21, 2004

Related U.S. Application Data

(60) Provisional application No. 60/461,279, filed on Apr. 7, 2003.

(51) Int. Cl.
*G06F 17/50* (2006.01)

(52) U.S. Cl. .......................................................... 703/1

(58) Field of Classification Search .................... 703/1; 707/104–110; 717/1; 705/10
See application file for complete search history.

(56) References Cited

U.S. PATENT DOCUMENTS

| | | | | |
|---|---|---|---|---|
| 5,404,440 | A * | 4/1995 | Asahi | 715/746 |
| 5,436,830 | A | 7/1995 | Zaltman | |
| 6,315,569 | B1 | 11/2001 | Zaltman | |
| 6,609,128 | B1 * | 8/2003 | Underwood | 707/10 |
| 2001/0052108 | A1 * | 12/2001 | Bowman-Amuah | 717/1 |
| 2002/0107721 | A1 * | 8/2002 | Darwent et al. | 705/10 |
| 2003/0097240 | A1 * | 5/2003 | Atasoy | 703/1 |
| 2004/0074173 | A1 * | 4/2004 | Miller | 52/234 |

OTHER PUBLICATIONS

AutoDesk Inc. "AutoCad 14, usre's Guide" Copyright 1998 AutoDesk Inc. pp. 602, 630, 8-9, 25, 210, and 690.*
Pittsburgh Architecture Firm Digs Deep . . . Into Psyche, AIArchitect, Sep. 2003, Google, pp. 1-3.*
Astorino Presents a Groundbreaking Research & Design Technique that Revolutionizes the Architectural Process, AIA Pennsylvania, Google, Jul. 2003, pp. 1-3.*
Astorino, L.D. Metaphorical Design Method, Architecture Week—Building Culture, Google, Oct. 2003, pp. C1.1-C1.2.*
Eberhard, J., "How the Brain Experiences Architecture", the AIA Journal of Architecture, Spring 2003, pp. 1-16.

* cited by examiner

*Primary Examiner*—Russell Frejd
(74) *Attorney, Agent, or Firm*—Reed Smith LLP

(57) ABSTRACT

A method for the development of a design in which design decisions are shaped in part by the conscious and subconscious thoughts of future users of an designed object or occupants of a designed space. Future users or occupants are preferably interviewed by a metaphor elicitation technique to ascertain their thoughts, feelings, and emotions about the specific kind of design under consideration. The data obtained concerning deep metaphors may then be analyzed through use of a deep design filter that breaks down metaphors into relevant dimensions and activating cues. The information regarding wants and needs of users or occupants is next prioritized and translated into a series of design objectives through interactive sessions among designers and with the individuals interacting with the design. Finally, the design objectives are evaluated, refined, and implemented in creating the design for the product or building. The methods are particularly useful for developing architectural designs.

18 Claims, 3 Drawing Sheets

THE DEEP METAPHORS OF TRANSFORMATION

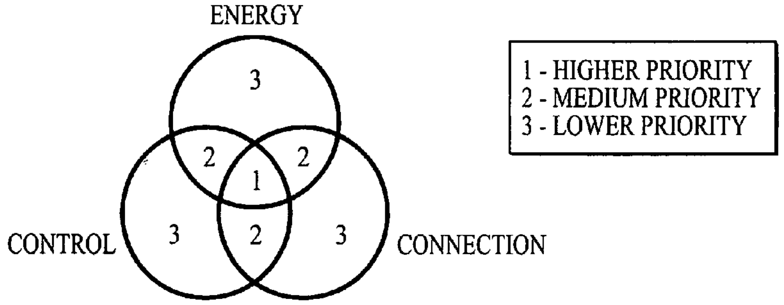

CONTROL: THE NEED FOR CONTROL OVER ONE'S LIFE AND ENVIRONMENT.
HOSPITALS PRESENT FEARFUL UNKNOWNS FOR FAMILIES AND A SENSE OF CONTROL HELPS FAMILIES RESPOND AND ADJUST TO THE CHALLENGES AHEAD.
THERE ARE TWO PRIMARY TYPES OF CONTROL:

1. CONTROL OVER THE ENVIRONMENT:
   - FEELING SAFE AND SECURE AND HAVING A SENSE OF PRIVACY IN INTIMATE SPACES.
   - HAVING THE HOSPITAL CHILD-FRIENDLY AND EFFICIENT IN ITS OPEN SPACES.
2. CONTROL OVER THE ILLNESS THROUGH ESCAPE.

CONNECTION: THE NEED TO CONNECT WITH YOURSELF, FAMILY, AND THE OUTSIDE WORLD.
THE HOSPITAL EXPERIENCE IS FILLED WITH CONNECTIONS:

1. TO THE INTERNAL WORLD - PATIENTS, FAMILY, AND STAFF.
2. TO THE EXTERNAL WORLD - OUTSIDE FAMILY AND FRIENDS.
3. TO ONESELF - ALONE TIME.
4. TO THE HOSPITAL - EMOTIONAL CONNECTIONS TO THE BUILDING SPACE ITSELF.

ALLOWING FOR POSITIVE CONNECTIONS TO OCCUR WILL LEAD TO A MORE POSITIVE EXPERIENCE OVERALL.

ENERGY: THE NEED FOR CERTAIN TYPES OF ENERGY AND ENERGY SOURCES.
PEOPLE ARE IN CONSTANT NEED OF ENERGY WHILE IN THE HOSPITAL.
ENERGY GIVES PEOPLE THE STRENGTH AND HOPE THEY NEED TO MAKE IT THROUGH THEIR HOSPITAL JOURNEY.
ASIDE FROM MEDICAL TREATMENTS, ENERGY IS THE MOST IMPORTANT HEALING AGENT.

FIG. 2

USER GROUP DIMENSIONS

| PRIORITY | *KEY DOMAIN | **USER | RELEVANT DIMENSIONS (ISSUE TO ADDRESS) | ACTIVATING CUES (RELATED WANTS & NEEDS) | DESIGN OBJECTIVES HUMAN | DESIGN OBJECTIVES ENVIRONMENTAL | COMMENTS |
|---|---|---|---|---|---|---|---|
| CONTROL<br>I. CHILD-FRIENDLY/FOCUS | | | | | | | |
| 1. | CT,CN,E | P,F,S | PEOPLE DESIRE A MORE CHILD-FRIENDLY HOSPITAL. THEY HOPE THAT THE NEW HOSPITAL WILL BE MORE INVITING AND INTERACTIVE FOR CHILDREN. | | | INTERACTIVE ART FOR KIDS.<br>"LITTLE PEOPLE" FURNITURE<br>APPROPRIATE SCALE<br>WALL TEXTURE AT LOWER LEVEL OF WALL SURFACE<br>PARTY ROOM FOR FAMILIES/ FRIENDS OF PATIENT<br>LOW WINDOWS FOR CHILDREN | 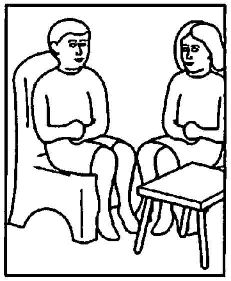<br>KID SIZED FURNITURE |
| 1. | CT,CN,E | P,F,S | OPEN SPACES GIVE THE HOSPITAL A FEELING OF BEING CHILD-FRIENDLY. | LET KIDS ACTUALLY BE THEMSELVES - BE KIDS. | | PLAY AREAS IN HOSPITAL/ ATRIUM<br>PLAY SPACE OUTSIDE<br>OPEN AREA IN PATIENT ROOMS<br>LARGER ATRIUM | |
| 2. | CT,CN,E | P,F,S | FEEL LIKE A KID'S ROOM | PEOPLE SHOULD KNOW IT IS A PEDIATRIC HOSPITAL | | FURNITURE SCALE<br>ABILITY FOR PERSONALIZATION<br>FAMILY COMFORT<br>SHELVES FOR GAMES AND OTHER PERSONAL OBJECTS<br>PLACE FOR DROP-DOWN TABLE TO EAT TOGETHER<br>FLEXIBLE SEATING FOR WHEN THERE ARE MORE VISITORS<br>LIGHTING CONTROL<br>COLORFUL ROOMS/WALLS<br>FURNITURE ARRANGEMENT IN PATIENT BEDROOM TO BE FLEXIBLE,<br>ALLOW FOR MULTIPLE SEATING ARRANGEMENTS<br>CONTROL MUSIC SYSTEM FROM BEDSIDE<br>COMPUTER/VIDEO GAMES | 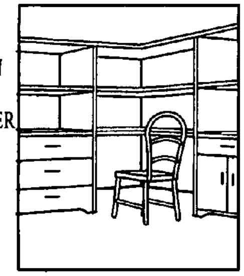<br>COOL ROOM! LIKED ALL THE COMPARTMENTS. PLACE FOR EVERYTHING. |

| COLOR CODE LEGEND | |
|---|---|
| 6/19/03 | STAFF BRAINSTORMING |
| 6/27/03 | FAMILY BRAINSTORMING |
| 11/17/03 | PATIENT BRAINSTORMING |
| | IN-HOUSE BRAINSTORMING |
| (VARIOUS DATES) | |

*CONTROL (CT), CONNECTION (CN), ENERGY (E)
**STAFF (S), PATIENT (P), FAMILY (F)

FIG. 3

DEEP DESIGN FILTER METHOD FOR DESIGN

CLAIM OF PRIORITY

This application claims priority to U.S. Provisional Patent Application Ser. No. 60/461,279, filed on Apr. 7, 2003.

BACKGROUND OF THE INVENTION

1. Field of the Invention

The present invention relates to techniques for the development of a design, and, more specifically, a system and method for identifying, organizing, prioritizing, and employing deep psychological metaphors, dimensions, and activating cues in the development of a design. The present invention is particularly useful in the field of architectural design.

2. Description of the Background

Traditionally, designers (e.g., architects, interior designers, landscape architects, and the like) have achieved designs through ideas that supported established, relevant goals. Design elements were selected based upon a design team's experience, as well as through client needs assessments, interviews, and surveys conducted during predesign. While these planning tools offer insights as a starting point for determining necessary physical attributes, they do not enable the designer to connect with the users and/or occupants of a design space on a profound emotional, intellectual, or experiential level.

A field in which such considerations are particularly important is that of architecture. Occupants (owners, tenants, employees, visitors, guests, etc.) of a building spend a large proportion of their time in that space. Accordingly, the conscious and subconscious perception of an architectural design by such occupants could be of paramount importance in informing the architectural design.

Several tools that are adapted to evaluate and extract the deep metaphors evoked in individuals presently exist. One such metaphor elicitation technique is the Zaltman Metaphor Elicitation Technique (ZMET), as disclosed in U.S. Pat. No. 5,436,830, which is hereby incorporated by reference. ZMET is a research protocol grounded in multidisciplinary sciences, including clinical psychology, anthropology, linguistics, cognitive neuroscience, and sociology.

The ZMET approach recognizes that people think and communicate in complex ways that are not captured through traditional focus groups and surveying methods. Through ZMET, the metaphors within an occupant's thoughts and feelings can be revealed, and information that individuals are unaware that they know can be uncovered. This "hidden knowledge" influences behavior and perception.

ZMET employees a multi-step process to elicit information from research subjects regarding a particular topic, with an emphasis on visual images, metaphors, and emotions. Initially, a research subject in a ZMET analysis creates a collection of photographs or drawings, such as those found in magazines or newspapers. These photographs or drawings depict images evocative of the metaphors underlying a subject's experience with a particular topic. The research subjects will then examine these images and sort them into groups having similar qualities.

Next, the subjects relate these images to their sensory and emotional perceptions of the topic being evaluated. The subject identifies what is and what is not an accurate sensory representation of the topic, in terms of sound, shape, tactile sensation, color, taste, smell, and emotional feeling. Both the present feelings that a subject has about a type of topic, as well as the feelings that would be elicited from an ideal experience with that stimulus are identified by the subject.

A formal interviewing process may then take place, in which the interviewer asks the subject for a detailed account of how the images relate to the topic. During this process, the subject can describe a selected image that most accurately represents certain feelings and emotions, or images that impart the opposite of the desired feelings and emotions, or that there is a lack of images embodying the desired feelings and emotions.

After identifying these concerns in the interview, the subject creates an image using the photographs and drawings which best summarizes the meaning of the topic, and also creates a map or causal model using the constructs which have been elicited to express the subject's overall thinking about the topic. This map serves as a guide to further preparing a movie-like vignette or video that is expressive of the subject's feelings about the given topic.

The final step of the metaphor elicitation technique occurs when a researcher creates a diagrammatic consensus map representing the researcher's understanding of the metaphors contained in the various subject's thoughts. It includes the most important constructs and their interrelationships, and describes most of the thinking of most of the subjects most of the time. In essence, it is a qualitative integration of the information provided by all the interviewed subjects.

While such metaphor elicitation techniques have traditionally been employed in developing marketing schemes for various products, no one to date has employed the results of metaphor elicitation techniques to inform or influence the design process. There has been a long standing need in the design community to access the deep metaphors felt by users of products and occupants of buildings and to use this information to generate designs that resonate with and enrich the users' perceptions and experiences.

Such a long standing need has been clearly recognized by those of skill in the architectural art (see e.g., Koonce, The AIA Journal of Architecture, Spring 2003, page 2, which is hereby incorporated by reference). The present invention addresses and satisfies these needs.

SUMMARY OF THE INVENTION

The present invention relates to a method for design that employs a deep design filter tool. The deep design approach of the present invention allows a designer to reach into the conscious and subconscious thoughts of users of an object that is being designed or future occupants (owners, tenants, employees, visitors, guests, etc.) of a building that is being designed and identify and prioritize how they interact with their physical environments. The process is performed by determining the deep metaphors of users and/or occupants who will use the object or building being designed, extracting relevant dimensions and activating cues from the metaphors, prioritizing these relevant dimensions and activating cues, and incorporating this information into design objectives and/or the actual design.

The design objectives and/or designs created through use of the deep design filter will be deep designs that resonate or build upon the basic deep metaphors underlying the users' and/or occupants' thoughts and feelings about the object or building that is being designed.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 2 depicts an example of the output of a metaphor elicitation technique; and FIG. 3 shows a description of some relevant dimensions and activating cues that may be derived from the analysis of deep metaphors.

DETAILED DESCRIPTION OF THE INVENTION

Figure 1:
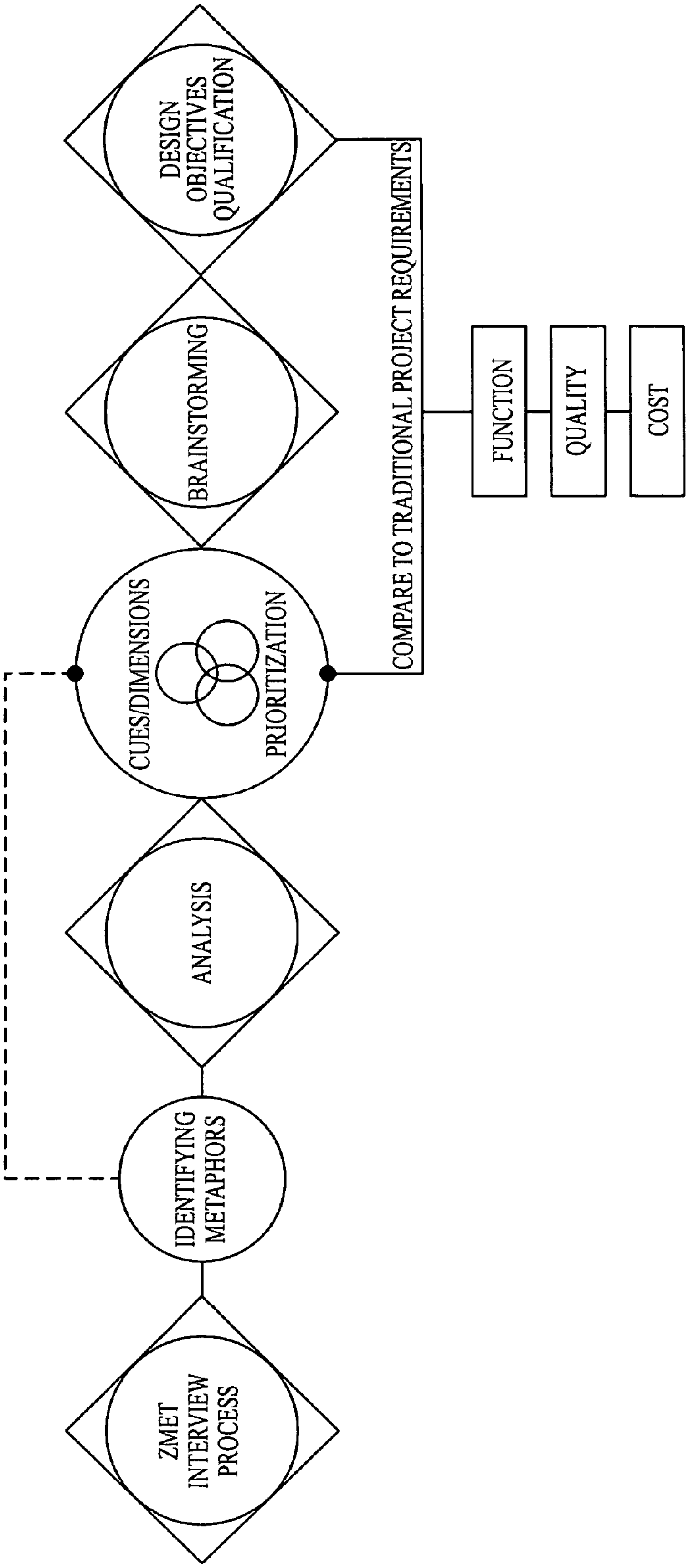
FIG. 1 shows a flow chart description of a preferred embodiment of the present invention.

It is to be understood that the figures and descriptions of the present invention have been simplified to illustrate elements that are relevant for a clear understanding of the invention. The detailed description will be provided hereinbelow with reference to the attached drawings.

The present invention may be generally employed by lead designers and other members of a design team to organize and prioritize the information obtained from using a metaphor elicitation technique to interview, for example, the future users of a product or occupants of a building. The deep design filter of the present invention allows designers to use this information to develop a project's initial design concepts, which are extensions of the occupants' thoughts. Thus, deep metaphors are converted into design solutions, and ultimately, incorporated into final designs.

The system and method of the present invention will preferably be described through the presentation of a presently-preferred embodiment, namely the application of the present invention to architectural design. The use of this example is not meant to be limiting in any sense. The same principles would apply to the development of a design for any number of design projects, including interior design of a residence, interior design of an automobile, design of landscape, design of furniture, and similar design projects.

Further examples of design situations to which the present invention may relate include the design of any public building such as a hospital, a library, a hotel, a community center, a spa, a resort, a health club, a university student union, a museum, a sports arena, a sports stadium, or an auditorium. The present invention may also be applied to exterior designs that include such projects as landscape, gardens, planned communities, and courtyards. In addition, the present invention may relate to the design of interior spaces, such as the interior of an automobile, public transit vehicles, the interior of military vehicles such as submarines, tanks, helicopters, and fighter jets, and office spaces. The present invention may also be applied to the design of so-called "virtual" spaces, such as a three dimensional world within a computer game or other simulated environment. Generally, the present invention may be particularly applicable to projects in which the design costs of the project comprise at least 5% of the overall cost of a project. In each of the above examples, the users or occupants of the design space who will be interviewed will preferably include individuals who use that space in some way, such as occupants, military personnel, tourists, game players, etc., as is appropriate for the particular design project.

In the context of architectural design, the present invention may be employed by architects and other members of a architectural design team to organize and prioritize the information obtained from using a metaphor elicitation technique to interview the future occupants of a building. The architectural design team may include such individuals as architects, builders, engineers, and other individuals who normally contribute to the design and eventual construction of a building. The deep design filter of the present invention allows the architectural design team to use this information to develop the project's initial design concepts, which are extensions of the occupants' thoughts. Thus, the deep metaphors that are elicited are converted into architectural design solutions, and ultimately influence the final design.

A generalized flowchart that depicts one presently preferred embodiment of the present invention is shown in FIG. 1. In this example, a ZMET interview process is initially conducted. This is one example of a metaphor elicitation technique, though others may be used. Through analysis of the interview process, deep metaphors are identified. By applying the deep design filter of the present invention, relevant dimensions and activating cues are derived and subsequently prioritized. These data are used in various brainstorming sessions (both among a design team and with users/occupants of the product of the design) and are compared to some traditional project requirements to arrive at design objectives, and ultimately a design.

Following the application of a metaphor elicitation technique, the systems and methods of the present invention preferably provide an interview report for review. The interview report lists and identifies the metaphors that emerged during an interview process. Often, there will be one overarching metaphor and several other supportive metaphors that serve to reinforce the overarching metaphor. Alternatively, several metaphors of equal importance may emerge with no general overarching metaphor.

The metaphors discovered and identified during the interview are then broken down, analyzed, and prioritized by the deep design filter of the present invention so that the gathered information can be effectively used in formulating architectural design objectives. As a first step, preferably two major domains of data are extracted from the interviews.

One of the domains extracted is preferably the "relevant dimensions". Within the context of the present invention, RELEVANT DIMENSIONS are defined as the issues that the interviewees requested to be addressed in creating a more desirable physical environment for a given design and are in many ways a general conceptual expression of the underlying deep metaphors. Thus, by way of example, a relevant dimension for occupants of a hospital could be that most hospitals appear "bland" and "antiseptic".

The relevant dimensions are then described in more detail by the other domain, which is a collection of supporting statements defined as "activating cues". Within the context of the present invention, ACTIVATING CUES are defined as specific desires for the design that are identified by the interviewees. The activating cues emerge from the interview and detail the related wants and needs of users of an object or occupants of a designed space as they were expressed more generally in the relevant dimensions. For example, as stated above, a relevant dimension for a hospital could be its bland and antiseptic appearance and feeling. The activating cues corresponding with this relevant dimension may be the (i) lack of artwork on the walls; (ii) the lack of bright-colored paints; (iii) the perceived darkness of the environment; (iv) that the environment feels stuffy; or (v) the perceived cramped or restricted nature of the hospital space.

Various types of occupants of a given type of building can be interviewed. For example, if input was being sought to aid in the architectural design of a hospital, interviews could be conducted with patients, family members of patients who visit the facility, and various staff who work at the hospital. By mapping all the relevant dimensions and activating cues identified by the various occupants, designers can prioritize them according to their contextual relationships to the deep metaphors.

Prioritization of any relevant dimensions and their associated activating cues may occur as described below. Any dimensions or activating cues that are identified by more than one type of occupant are preferably given a higher priority in their application to the design process. A dimension that is identified by all or nearly all types of occupants would be given a higher priority, while a dimension identified by only one type of occupant would be given a lower priority. Similarly, prioritization may also be based on the number of metaphors that correspond with a given relevant dimension and its activating cues. Thus, a relevant dimension that is identified by many different types of occupants and that relates to the most individual metaphors, would be given a higher priority in creating a design.

The entire prioritization process may be performed manually or in an automated manner. In the manual process, the relevant dimensions and activating cues could be listed in chart format and color-coded based on their corresponding deep metaphors and/or based on which occupant provided the input. The frequency of responses can then be diagrammatically mapped, and the responses that overlap various deep metaphors can be illustrated by way of Venn diagrams (see, e.g. FIG. 2). In an automated version, a computer could be used to determine the frequency of the various responses and suggestions. Additionally, the computer could be programmed with data related to cost and/or other design limitations to examine the practically of implementing the prioritized responses and to circumscribe the output accordingly.

Next, the design team will preferably translate these prioritized relevant dimensions and their associated activating cues into a series of design objectives. In a presently-preferred embodiment of the present invention, the design team will engage in brainstorming sessions, both internally among the design team and externally with the future occupants to develop the initial design objectives. During sessions with the occupants, the design team can stimulate input from the occupants by showing photographs or drawings of potential designs and inquiring how the designs might meet the related design objectives. As well as allowing for an evaluation of the existing design possibilities, feedback from the occupants can result in additional design ideas that may be implemented. Thus, the brainstorming sessions will further explore the results obtained by the deep design filter process and incorporate these results into actual design ideas.

The input obtained during these brainstorming sessions will allow the designers to reframe the design objectives and then produce provisional conceptual images and drawings. Finally, these provisional conceptual images and drawings are evaluated and refined by the design team to develop final images and drawings that can then be executed into the final design of the building.

In Example 1, the deep design filter process can be applied to the architectural design of any type of building, whether residential or commercial, regardless of size or function.

EXAMPLE 1

By way of example, the deep design filter process can be employed to optimize the occupants' experiences with a hospital building.

Through metaphor elicitation technique interviews with the various occupants of a hospital facility (patients, visiting family members, staff, etc.), insight is gained into the metaphors underlying the hospital experience. The overarching metaphor obtained from the metaphor elicitation techniques for a hospital may be one of transformation. Transformation occurs by the healing process that takes a patient from an unbalanced state (sickness) to a balanced state (health). A successful transformation depends on many factors, including quality medical care obviously, and also including the physical environment of the hospital. Thus, architecture is essential for restoring balance.

Several supportive deep metaphors combine to reinforce this transformation: for example, control, connection, and energy. An example of the results of a metaphor elicitation technique that could be generated within this example is shown in FIG. 2. Control is specifically the need for control over one's life and environment. Connection is the need to connect with the outside world, and to oneself and other people. Energy is the need for certain types of energy and energy sources. At the most basic level, control is enhanced by the physical environment, and connection is enhanced by the social environment, although certain ideas, such as privacy, escape, isolation, or loneliness can be shared between the metaphors. Both control and connection provide energy, which is vital to a successful transformation.

Control can be broken down further into two components: control over the hospital environment and control over the illness. Control over the hospital environment includes feeling safe and secure and having a sense of privacy in intimate spaces. Privacy gives comfort and security, which in turn facilitates comfort and security. Control over the illness allows patients and family to escape from the stresses of the illness.

Connection appears in many varieties during the hospital experience: connection with the internal hospital world, connection to the external world, connection to one's self, and connection to the hospital building itself. Allowing for positive connections to be made will lead to a more positive overall hospital experience.

Connections in the hospital environment can foster the feeling of home and create a family-like support network. Connection can provide empathy to patients and family members, enable information sharing, help individuals escape their worries, and diminish feelings of isolation. Connection to others provides empathy to patents and family who seek others whom understand their situation.

Connection also allows for information sharing among hospital occupants who are constantly in need of information. Information allows patients and family members to be better prepared for their hospital journey. Connection also helps people escape from their worries. Individuals may escape either through leisure time spent performing activities either alone or with others.

Privacy is also a critical component of connection. Family members need privacy to communicate privately and connect with one another. Individuals also need privacy to focus on themselves and maintain a healthy mental balance.

Finally, control and connection feed into energy, which causes the transformative process to occur. People are in constant need of energy while in the hospital. Energy gives people the strength and hope they need to make it through their hospital journey. Stress and other negative feelings can drain energy and jeopardize a successful transformation. On the other hand, when energy is replenished, successful transformation can occur. Energy from relaxation is sought when people need to refocus or clear their minds.

After these deep metaphors (e.g. control, connection, energy) have been determined via the metaphor elicitation technique interview process, the deep design filter of the present invention is employed to examine the corresponding major domains of data, namely the relevant dimensions and activating cues.

For example, the deep metaphor of control can be broken down into several relevant dimensions and their associated activating cues. An example of the results of such an analysis may be found in FIG. 3. In many large modern hospitals, navigating through a confusing system of hallways leaves patients, visitors, and staff alike feeling lost, confused, or frustrated. Floor layouts are often illogical, convoluted, and maze-like. It is not uncommon for patient rooms or visitor areas to give the feeling of being trapped or closed in, which adds to already-present anxiousness and impatience. Many hospital rooms and other areas have no clocks, leading to a feeling that time is moving slowly. This can cause family members of patients to feel frustrated and upset. Bland architecture and muted colors make the hospital feel more institutional, which, in turn, lead to feelings of boredom, discomfort, and hopelessness.

The relevant dimensions and activating cues behind the deep metaphor of connection are similarly analyzed through use of the deep design filter. Generally, occupants want the hospital to feel more warm, welcoming and comforting, or more "like home." This includes creating an atmosphere of normalcy for patients and families, and enhancing the sense of belonging for hospital staff. Windowless rooms make all occupants feel that they are cut off from the outside world, which fosters feelings of loneliness and isolation.

The deep metaphor of energy is also broken down by the deep design filtering process. Patients need sources of energy in their environment to facilitate the healing process necessary for their transformations. Family members need physical surroundings that can stimulate them and aid in their support to the patients, and also to revitalize them and sustain their own psychological well being under stressful conditions. Staff members similarly desire an environment that will invigorate them and enable them to provide the best possible patent care.

Having determined the above relevant dimensions and activating cues, prioritization can be done by comparing the results from the various groups of occupants. Thereafter, the design team, both amongst themselves and in conjunction with groups of patients, family members and staff, can formulate design objectives to meet the needs of the occupants based on the relevant dimensions and activating cues.

In the present scenario, the design team would implement a variety of decisions based on the deep design filter process. Hallways and corridors would be designed with an efficient layout to diminish the lack of control that occupants feel over their physical environment. Control over the illness can be facilitated through a sense of escape provided by pleasant distractions such as colorful paintings and artwork. These distractions divert people's focus away from feeling trapped, and may be particularly beneficial in waiting areas and patient rooms.

Connection can be achieved through design by providing skylights, atriums, patios, or other means of experiencing sunlight and providing contact with he outside world. Physical escapes to the outside world brighten the spirits, and nature cues inside the hospital itself represent health and provide hope to patients' families, while simultaneously reducing stress and promoting relaxation of staff members. Private rooms for patients and private waiting areas for families away from staff conversations can provide the privacy to connect with one's immediate family or to stay in tune with one's own thoughts.

Energy can be supplied through many design features in a hospital setting. Hospital environments such as outdoor patios, chapels, and libraries are examples of potential energy sources. Energy can also come from stimulating activities that are sought out when people need distractions. Decorative hallways, gyms, and playrooms for children are a few such facilities that allow for stimulation. Other types of escapes include running water, music, natural light, and color. Specifically, bright colors can stimulate bored individuals, while soft colors can be used to relieve stress.

Taken together, in this hospital example of the deep design filter process, the final design decisions as guided by the deep design filter should involve the relevant dimensions and activating cues for the metaphor of transformation. Specifically, the design choices guided by the deep design filters will lead to feelings of control and connection, which will complement each other, and further lead to or reinforce the metaphor of energy.

EXAMPLE 2

In a second example, the deep design filter could also be used in the design of a residential home. Initially, a metaphor elicitation technique process would likely yield several deep metaphors.

The first metaphor, for example, might be containment, i.e., a home is a container that allows for certain types of connections and emotional drivers to exist. Certain rooms will be "closed" containers, which will primarily provide security, intimacy, and calmness. One example of such a room is a bedroom. On the other hand, some rooms are "open" containers, which primarily provide space for social activities, which can be both fun and exciting or simply calm. Examples of such open container rooms include family rooms and kitchens.

Another metaphor that arises in thinking about a home is connection. This can include self connection or connection to others. Rooms and areas of the house should be designed in order to foster these types of connections.

Emotional experiences are other metaphors that may emerge. Two particular types of emotional experiences are feeling relaxed and feeling energized. Relaxation deals with calm, soothing, and tranquil experiences and is often associated with self connection and connection to others. Energization comes from experiences that are fun, interesting, and lively and is often associated with connection to others.

Each room of a home can involve different relevant dimensions and activating cues when the deep design filter process is employed. For instance, relevant dimensions and activating cues for a bedroom may be that sleep is important and that the bedroom should be worry-free and restful. A bedroom should therefore be simple, yet comfortable.

In contrast, a family room may involve very different relevant dimensions and activating cues. These may include a desire for fun and a comfortable area for all the members of the family. A kitchen may involve yet another differing set of relevant dimensions and activating cues. A primary purpose of a kitchen is for the preparation of meals, and thus adequate space is needed to allow for this. Additionally, a kitchen should also allow for informal socialization and connection with others.

After the deep design filter is used to determine the relevant dimensions and activating cues for the occupants of a home, important design issues can be addressed to meet these needs. These could include: providing for adequate storage and closet space to allow the home to be organized and functional and thus promote a feeling of control for the occupants; creating feelings of openness and connection to nature through natural lighting to promote self connection and energy; employing more soothing colors in areas such as the bedrooms and more stimulating colors in rooms where more social interaction will take place; and allowing for speakers to be placed through the house so that soothing and/or invigorating music may be played.

EXAMPLE 3

By way of example, the deep design filter process can be employed in the design of the interior of an automobile. In this example, potential drivers of an automobile would participate in a metaphor elicitation technique. The metaphors felt by drivers and passengers would be extracted through interviews in which drivers and passengers were asked to express their impressions and feelings regarding their experience in an automobile. For example, drivers may feel the need for energy and freedom while driving the automobile. In addition, drivers and passengers may also identify security as a secondary metaphor, particularly if the automobile is a more family-oriented vehicle.

Using these deep metaphors, the deep design filter of the present invention is employed to examine the corresponding relevant dimensions and activating cues. An example of a potential relevant dimension regarding an experience in an automobile could be that passengers like to be in control, even when they are in the rear seat of an automobile. An activating cue could be that there are no controls (e.g. climate or radio controls) for the rear seats of an automobile. A design objective could then be to include personal controls in the back seat so as to allow passengers to control their environment.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art of design, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method of developing design objectives comprising the steps of:

analyzing a set of results of a metaphor elicitation technique;

extracting relevant dimensions and activating cues from said set of results;

prioritizing said relevant dimensions and said activating cues; and developing said design objectives through use of said relevant dimensions and said activating cues, wherein said design objectives are selected from the group consisting of architectural design objectives, interior design objectives, and exterior design objectives, wherein at least one of said steps is implemented on a computer.

2. The method of claim 1, further comprising the step of transforming said design objectives into a design.

3. The method of claim 1 further comprising the step of performing said metaphor elicitation technique before said analyzing step.

4. The method of claim 1 further comprising the step of prioritizing said relevant dimensions and said activating cues using an automated computer program.

5. The method of claim 1, wherein said architectural design objectives are for a hospital, residential home, a library, a hotel, a community center, a spa, a resort, a health club, a university student union, a museum, a sports arena, a sports stadium, or an auditorium.

6. The method of claim 1, wherein said interior design objectives are for an interior of an automobile, an interior of a military vehicle, an interior of a public transit vehicle, or an interior of an office space.

7. The method of claim 6, wherein said military vehicle is selected from the group consisting of submarine, tank, helicopter, and fighter jet.

8. The method of claim 1, wherein said exterior design objectives are for a landscape, a garden, a planned community, or a courtyard.

9. The method of claim 1, wherein said design objectives are for computer-simulated environments.

10. The method of claim 9, wherein said computer simulated environment is a computer gaming environment.

11. The method of claim 1, wherein said developing of design objectives represents a portion of a project, further wherein a cost of said developing of design objectives are at least 5% of an overall cost of said project.

12. A method of developing architectural design objectives for use in design of a building comprising the steps of:

applying a metaphor elicitation technique, wherein said metaphor elicitation technique includes conducting an interview with at least one future occupant of said building, wherein said applying step provides a set of metaphors;

analyzing a set of results of said metaphor elicitation technique, wherein said set of results includes a transcript of said interview and said set of metaphors;

extracting relevant dimensions and activating cues from said set of results, wherein said extracting includes evaluating transcripts of said interview;

determining how said relevant dimensions and activating cues are related to said set of metaphors;

prioritizing said relevant dimensions and said activating cues, wherein said prioritizing comprises:

determining a number of times that each of said relevant dimensions and activating cues are mentioned by said at least one future occupant and determining a number of occupants who mentioned said relevant dimensions and activating cues; and developing said design objectives through use of said relevant dimensions and said activating cues, wherein said developing is accomplished by an architectural design team, wherein at least one of said steps is implemented on a computer.

13. The method of claim 12, wherein said architectural design team includes at least one individual selected from the group of architects, engineers, builders, and landscape architects.

14. The method of claim 12, wherein said occupants are selected from the group consisting of owners of a building, tenants of a building, employees who work in a building, visitors to a building, and medical patients who are treated in a building.

15. The method of claim 14, wherein said building is a hospital.

16. The method of claim 15, wherein said building is a library.

17. A method of developing a design, comprising the steps of:

selecting a project to design, wherein said project is an architectural project;

selecting a group of users of the project;

performing a metaphor elicitation technique with said group of users;

analyzing a set of results of said metaphor elicitation technique;

extracting relevant dimensions and activating cues from said set of results;

prioritizing said relevant dimensions and said activating cues;

developing a set of design objectives through use of said relevant dimensions and said activating cues; and developing a design based on said set of design objectives, wherein at least one of said steps is implemented on a computer.

18. The method of claim 17, wherein said metaphor elicitation technique is performed on future occupants of said architectural project.

* * * * *